US007047296B1

(12) United States Patent
Safstrom et al.

(10) Patent No.: US 7,047,296 B1
(45) Date of Patent: May 16, 2006

(54) METHOD AND SYSTEM FOR SELECTIVELY DEDICATING RESOURCES FOR RECORDING DATA EXCHANGED BETWEEN ENTITIES ATTACHED TO A NETWORK

(75) Inventors: Dan Safstrom, Suwanee, GA (US); Dan Spohrer, Alpharetta, GA (US)

(73) Assignee: Witness Systems, Inc., Roswell, GA (US)

( * ) Notice: Subject to any disclaimer, the term of this patent is extended or adjusted under 35 U.S.C. 154(b) by 704 days.

(21) Appl. No.: 10/137,480

(22) Filed: Apr. 30, 2002

Related U.S. Application Data

(63) Continuation-in-part of application No. 10/061,491, filed on Jan. 31, 2002, and a continuation-in-part of application No. 10/061,489, filed on Jan. 31, 2002, and a continuation-in-part of application No. 10/061,469, filed on Jan. 31, 2002, and a continuation-in-part of application No. 10/058,911, filed on Jan. 28, 2002, now abandoned.

(51) Int. Cl.
*G06F 15/173* (2006.01)
(52) U.S. Cl. .................. 709/224; 709/202; 709/223; 709/238; 705/27; 705/30; 705/52; 379/112.01
(58) Field of Classification Search ................ 709/223, 709/224, 226, 202, 238; 705/52, 27, 30; 379/112.01
See application file for complete search history.

(56) References Cited

U.S. PATENT DOCUMENTS

| 3,594,919 A | 7/1971 | De Bell et al. |
| 3,705,271 A | 12/1972 | De Bell et al. |
| 4,684,349 A | 8/1987 | Ferguson et al. |
| 5,101,402 A | 3/1992 | Chiu et al. |
| 5,267,865 A | 12/1993 | Lee et al. |
| 5,311,422 A | 5/1994 | Loftin et al. |
| 5,597,312 A | 1/1997 | Bloom et al. |
| 5,717,879 A | 2/1998 | Moran et al. |
| 5,790,798 A | 8/1998 | Beckett, II et al. |
| 5,809,250 A | 9/1998 | Kisor |
| 5,825,869 A | 10/1998 | Brooks et al. |
| 5,958,016 A * | 9/1999 | Chang et al. ................ 709/229 |
| 5,978,648 A | 11/1999 | George et al. |
| 6,009,429 A | 12/1999 | Greer et al. |
| 6,014,134 A | 1/2000 | Bell et al. |
| 6,014,647 A | 1/2000 | Nizzari et al. |
| 6,018,619 A * | 1/2000 | Allard et al. ................ 709/224 |
| 6,035,332 A * | 3/2000 | Ingrassia et al. ............ 709/224 |
| 6,038,544 A | 3/2000 | Machin et al. |
| 6,039,575 A | 3/2000 | L'Allier et al. |

(Continued)

OTHER PUBLICATIONS

Witness Systems promotional brochure for eQuality entitled *"Bringing eQuality to eBusiness"*.

(Continued)

*Primary Examiner*—Saleh Najjar
*Assistant Examiner*—Liang-che Wang
(74) *Attorney, Agent, or Firm*—Fish & Richardson P.C.

(57) ABSTRACT

Recording resources are selectively dedicated for recording data exchanged between entities attached to a network including at least one agent in an enterprise, a user, and a server connected to the agent and the user. At least one interconnection point is selected among interconnection points in the network including one or more points between the user and the server, between the server and a data distributor connected to the user and the agent, and between the agent and the server for recording the exchanged data. Recording resources are dedicated to the selected interconnection point for recording the exchanged data based on an objective for recording the data.

30 Claims, 6 Drawing Sheets

U.S. PATENT DOCUMENTS

| | | | |
|---|---|---|---|
| 6,057,841 | A | 5/2000 | Thurlow et al. |
| 6,076,099 | A * | 6/2000 | Chen et al. ............ 709/202 |
| 6,078,894 | A | 6/2000 | Clawson et al. |
| 6,108,711 | A * | 8/2000 | Beck et al. ............ 709/242 |
| 6,122,665 | A | 9/2000 | Bar et al. |
| 6,122,668 | A | 9/2000 | Teng et al. |
| 6,138,139 | A * | 10/2000 | Beck et al. ............ 709/202 |
| 6,144,991 | A | 11/2000 | England |
| 6,146,148 | A | 11/2000 | Stuppy |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,236,977 | B1 * | 5/2001 | Verba et al. ............ 705/10 |
| 6,244,758 | B1 * | 6/2001 | Solymar et al. ......... 709/224 |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIlwaine et al. |
| 6,324,282 | B1 | 11/2001 | McIllwaine et al. |
| 6,347,374 | B1 * | 2/2002 | Drake et al. ............ 713/200 |
| 6,351,467 | B1 | 2/2002 | Dillon |
| 6,370,574 | B1 | 4/2002 | House et al. |
| 6,404,857 | B1 | 6/2002 | Blair et al. |
| 6,418,471 | B1 | 7/2002 | Shelton et al. |
| 6,459,787 | B1 | 10/2002 | McIllwaine et al. |
| 6,493,758 | B1 | 12/2002 | McLain |
| 6,502,131 | B1 * | 12/2002 | Vaid et al. ............ 709/224 |
| 6,510,220 | B1 | 1/2003 | Beckett, II et al. |
| 6,535,909 | B1 | 3/2003 | Rust |
| 6,542,602 | B1 | 4/2003 | Elazar |
| 6,546,405 | B1 | 4/2003 | Gupta et al. |
| 6,583,806 | B1 | 6/2003 | Ludwig et al. |
| 6,606,657 | B1 | 8/2003 | Zilberstein et al. |
| 6,674,447 | B1 | 1/2004 | Chiang et al. |
| 6,683,633 | B1 | 1/2004 | Holtzblatt et al. |
| 6,697,858 | B1 * | 2/2004 | Ezerzer et al. ......... 709/224 |
| 6,757,361 | B1 | 6/2004 | Blair et al. |
| 6,772,396 | B1 | 8/2004 | Cronin et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,870,916 | B1 | 3/2005 | Henrikson et al. |
| 6,901,438 | B1 | 5/2005 | Davis et al. |
| 2001/0000962 | A1 | 5/2001 | Rajan |
| 2001/0032335 | A1 | 10/2001 | Jones |
| 2002/0038363 | A1 | 3/2002 | MacLean |
| 2002/0052948 | A1 * | 5/2002 | Baudu et al. ............ 709/224 |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0079020 | A1 | 4/2003 | Gourraud et al. |
| 2003/0144900 | A1 | 7/2003 | Whitmer |
| 2004/0100507 | A1 | 5/2004 | Hayner et al. |
| 2005/0138560 | A1 | 6/2005 | Lee et al. |

OTHER PUBLICATIONS

Witness Systems promotional brochure for eQuality entitled "Building Customer Loyalty Through Business-Driven Recording of Multimedia Interactions in your Contact Center," (2000).

Edward L. Nash, *Database Marketing*, 1993, pp. 158-165, 172-185, McGraw Hill, Inc., USA.

"Customer Spotlight: Navistar International," Web page, unverified print date of Apr. 1, 2002.

"DKSystems Integrates QM Perception with OnTrack for Training," Web page, unverified print date of Apr. 1, 2002, unverified cover date of Jun. 15, 1999.

"PriceWaterhouseCoopers Case Study: The Business Challenge," Web page, unverified cover date of 2000.

"'OnTrack Online' Delivers New Web Functionality," Web page, unverified print date of Apr. 2, 2002, unverified cover date of Oct. 5, 1999.

Untitled. 10th Mediterranean Electrotechnical Conference vol. I pp. 124-126 (2000).

Unknown Author. "Long-distance learning," *InfoWorld* 20(36):7276 (1998).

Abstract. net.working: "An Online Webliography," *Technical Training* pp. 4-5 (Nov./Dec. 1998).

Adams et al. "Our Turn-of-the-Century Trend Watch" *Technical Training* pp. 46-47 (Nov./Dec. 1998).

Barron. "The Road to Performance: Three Vignettes," *Technical Skills and Training* pp. 12-14 (Jan. 1997).

Bauer. "Technology Tools: Just-In-Time Desktop Training is Quick, Easy, and Affordable," *Technical Training* pp. 8-11 (May/Jun. 1998).

Beck et al. "Applications of AI in Education," *AMC Crossroads* vol. 1:1-13 (Fall 1996), Web page, unverified print date of Apr. 12, 2002.

Benson and Cheney. "Best Practices in Training Delivery," *Technical Training* pp. 14-17 (Oct. 1996).

Bental and Cawsey. "Personalized and Adaptive Systems for Medical Consumer Applications," *Communications ACM* 45(5):62-63 (May 2002).

Benyon and Murray. "Adaptive Systems: from intelligent tutoring to autonomous agents," pp. 1-52, Web page, unknown date.

Blumenthal et al. "Reducing Development Costs with Intelligent Tutoring System Shells," pp. 1-5, Web page, unverified print date on Apr. 9, 2002, unverified cover date of Jun. 10, 1996.

Brusilovsky et al. "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin. ISIS-Tutor: An Intelligent Learning Environment for CDS/ISIS Users, @ pp. 1-15 Web page, unverified print date of May 2, 2002.

Brusilovsky. "Adaptive Educational Systems on the World-Wide-Web: A Review of Available Technologies," pp. 1-10, Web Page, unverified print date of Apr. 12, 2002.

Byrnes et al. "The Development of a Multiple-Choice and True-False Testing Environment on the Web," pp. 1-8, Web page, unverified print date Apr. 12, 2002, unverified cover date of 1995.

Calvi and De Bra. "Improving the Usability of Hypertext Courseware through Adaptive Linking," *ACM*, unknown page numbers (1997).

Coffey. "Are Performance Objectives Really Necessary?" *Technical Skills and Training* pp. 25-27 (Oct. 1995).

Cohen. "Knowledge Management's Killer App," pp. 1-11, Web page, unverified print date of Apr. 12, 2002, unverified cover date of 2001.

Cole-Gomolski. "New ways to manage E-Classes," *Computerworld* 32(48):4344 (Nov. 30, 1998).

Cross. "Sun Microsystems—the SunTAN Story," Internet Time Group 8 (© 2001).

Cybulski and Linden. "Teaching Systems Analysis and Design Using Multimedia and Patterns." unknown date, unknown source.

De Bra et al. "Adaptive Hypermedia: From Systems to Framework," *ACM* (2000).

De Bra. "Adaptive Educational Hypermedia on the Web," *Communications ACM* 45(5):60-61 (May 2002).

Dennis and Gruner. "Computer Managed Instruction at Arthur Andersen & Company: A Status Report," *Educational Technical* pp. 7-16 (Mar. 1992).

Diessel et al. "Individualized Course Generation: A Marriage Between CAL and ICAL," *Computers Educational* 22(1/2)57-64 (1994).

Dyreson. "An Experiment in Class Management Using the World-Wide Web," pp. 1-12, Web page, unverified print date of Apr. 12, 2002.

E Learning Community. "Excellence in Practice Award: Electronic Learning Technologies," *Personal Learning Network* pp. 1-11, Web page, unverified print date of Apr. 12, 2002.

*e-Learning the future of learning*, THINQ Limited, London. Version 1.0 (2000).

Eklund and Brusilovsky. "The Value of Adaptivity in Hypermedia Learning Environments: A Short Review of Empirical Evidence," pp. 1-8, Web page, unverified print date of May 2, 2002.

Eline. "Case Study: Bridging the Gap in Canada's IT Skills," *Technical Skills and Training* pp. 23-25 (Jul. 1997).

Eline. "A Trainer's Guide to Skill Building," *Technical Training* pp. 34-41 (Sep./Oct. 1998).

Eline. "Case Study: IBT's Place in the Sun," *Technical Training* pp. 12-17 (Aug./Sep. 1997).

Fritz. "ToolBook II: Asymetrix's updated authoring software tackles the Web," *Emedia Professional* 10(2):102106 (Feb. 1997).

Fritz. "CB templates for productivity: Authoring system templates foe trainers," *Emedia Professional* 10(8):6876 (Aug. 1997).

Gibson et al. "A Comparative Analysis of Web-Based Testing and Evaluation Systems," pp. 1-8, Web page, unverified print date of Apr. 11, 2002.

Hallberg and DeFiore. "Curving Toward Performance: Following a Hierarchy of Steps Toward a Performance Orientation," *Technical Skills and Training* pp. 9-11 (Jan. 1997).

Harsha. "Online Training 'Sprints' Ahead," *Technical Training* pp. 27-29 (Jan./Feb. 1999).

Heideman. "Writing Performance Objectives Simple as A-B-C (and D)," *Technical Skills and Training* pp. 5-7 (May/Jun. 1996).

Heideman. "Training Technicians for a High-Tech Future: These six steps can help develop technician training for high-tech work," pp. 11-14 (Feb./Mar. 1995).

Hollman. "Train Without Pain: The Benefits of Computer-Based Training Tools," pp. 1-11, Web page, unverified print date of Mar. 20, 2002, unverified cover date of Jan. 1, 2000.

Klein. "Command Decision Training Support Technology," Web page. unverified print date of Apr. 12, 2002.

Koonce. "Where Technology and Training Meet," *Technical Training* pp. 10-15 (Nov./Dec. 1998).

Kursh. "Going the distance with Web-based training," *Training and Development* 52(3):5053 (Mar. 1998).

Larson. "Enhancing Performance Through Customized Online Learning Support," *Technical Skills and Training* pp. 25-27 (May/Jun. 1997).

Linton et al. "OWL: A Recommender System for Organization-Wide Learning," *Educational Technical Society* 3(1):62-76 (2000).

Lucadamo and Cheney. "Best Practices in Technical Training," *Technical Training*, pp. 21-26 (Oct. 1997).

McNamara. "Monitoring Solutions: Quality Must Be Seen and Heard," *Inbound/Outbound* pp. 66-67 (Dec. 1989).

Merrill. "The New Component Design Theory: Instruction design for courseware authoring," *Instructional Science* 16:19-34 (1987).

Minton-Eversole. "IBT Training Truths Behind the Hype," *Technical Skills and Training* pp. 15-19 (Jan. 1997).

Mizoguchi. "Intelligent Tutoring Systems: The Current State of the Art," *Trans. IEICE* E73(3):297-307 (Mar. 1990).

Mostow and Aist. "The Sounds of Silence: Towards Automated Evaluation of Student Learning a Reading Tutor that Listens" *American Association for Artificial Intelligence*, Web page, unknown date Aug. 1997.

Mullier et al. "A Web base Intelligent Tutoring System," pp. 1-6, Web page, unverified print date of May 2, 2002.

Nelson et al. "The Assessment of *End-User Training Needs,*" *Communications ACM* 38(7):27-39 (Jul. 1995).

O'Herron. "CenterForce Technologies' CenterForce Analyzer," Web page, unverified print date of Mar. 20, 2002, unverified cover date of Jun. 1, 1999.

O'Roark. "Basic Skills Get a Boost," *Technical Training* pp. 10-13 (Jul./Aug. 1998).

Pamphlet. "On Evaluating Educational Innovations[1]," authored by Alan Lesgold, unverified cover date of Mar. 5, 1998.

Papa et al. "A Differential Diagnostic Skills Assessment and Tutorial Tool," *Computer Education* 18(1-3):45-50 (1992).

Phaup. "New Software Puts Computerized Tests on the Internet: Presence Corporation announces breakthrough Question Mark™ Web product," Web page, unverified print date of Apr. 1, 2002.

Phaup. "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.

Phaup. "QM Perception™ Links with Integrity Training's WBT Manager†™ to Provide Enhanced Assessments for Web-Based Courses," Web page, unverified print date of Apr. 1, 2002, unverified cover date of Mar. 25, 1999.

Phaup. "Question Mark Introduces Access Export Software," Web page, unverified print date of Apr. 2, 2002, unverified cover date of Mar. 1, 1997.

Piskurich. "Now-You-See-'Em, Now-You-Don't Learning Centers," *Technical Training* pp. 18-21 (Jan./Feb. 1999).

Read. "Sharpening Agents' Skills," pp. 1-15, Web page, unverified print date of Mar. 20, 2002, unverified cover date of Oct. 1, 1999.

Reid. "On Target: Assessing Technical Skills," *Technical Skills and Training* pp. 6-8 (May/Jun. 1995).

Stormes. "Case Study: Restructuring Technical Training Using ISD," *Technical Skills and Training* pp. 23-26 (Feb./Mar. 1997).

Tennyson. "Artificial Intelligence Methods in Computer-Based Instructional Design," *Journal of Instructional Development* 7(3):17-22 (1984).

The Editors, Call Center. "The Most Innovative Call Center Products We Saw in 1999," Web page, unverified print date of Mar. 20, 2002,, unverified cover date of Feb. 1, 2000.

Tinoco et al. "Online Evaluation in WWW-based Courseware," *ACM* pp. 194-198 (1997).

Uiterwijk et al. "The virtual classroom," *InfoWorld* 20(47):6467 (Nov. 23, 1998).

Watson and Belland. "Use of Learner Data in Selecting Instructional Content for Continuing Education," *Journal of Instructional Development* 8(4):29-33 (1985).

Weinschenk. "Performance Specifications as Change Agents," *Technical Training* pp. 12-15 (Oct. 1997).

PCT International Search Report, International Application No. PCT/US03/02541, mailed May 12, 2003.

* cited by examiner

METHOD AND SYSTEM FOR SELECTIVELY DEDICATING RESOURCES FOR RECORDING DATA EXCHANGED BETWEEN ENTITIES ATTACHED TO A NETWORK

CROSS-REFERENCE TO RELATED APPLICATIONS

This application is a continuation-in-part of commonly assigned U.S. patent applications Ser. Nos. 10/061,469, 10/061,489, and 10/061,491 filed Jan. 31, 2002 and hereby incorporated by reference. This application is also a continuation-in-part of commonly assigned U.S. patent application Ser. No. 10/058,911, filed Jan. 28, 2002 now abandoned and hereby incorporated by reference. This application is also related to copending, commonly assigned U.S. patent applications entitled "Methods and System for Categorizing and Cataloguing Recorded Interactions", "Method and System for Providing Access to Captured Multimedia Data from a Multimedia Player" and "Method and System for Presenting Events Associated with Recorded Data Exchanged Between a Server and a User", filed on the same day as the present application and hereby incorporated by reference.

BACKGROUND

The present invention is directed to a method and system for selectively dedicating recording resources. More particularly, the present invention is directed to a method and system for selectively dedicating recording resources for recording data exchanged between entities attached to a network.

For systems employing interactions between a user and server, it is often desirable to be able to view the interactions, ideally in a manner that is transparent to the user. This is particularly desirable in a context such as sales, customer service, and e-commerce, where interactions between customers and a service provider are important indicators of customer satisfaction. As enterprises grow, it is important to keep track of interactions between agents of the enterprise and other parties. For example, as businesses grow, it is important to keep track of customer service contacts.

Attempts have been made to record and replay interactions between a server and a user. However, these attempts are typically implemented at the server and are thus suitable only for a particular type of server. In addition, these approaches typically do not distinguish between interactions that are considered important and interactions that are not important. Thus, a lot of time and resources are wasted on replaying unimportant recorded interactions.

Another problem with conventional attempts for recording and replaying interactions is that recording resources are not typically handled efficiently. Depending on the data to be recorded, the point(s) in the network at which recording would be most efficient and/or optimal may vary. However, recording resources are typically designated for recording from a predefined point in the network, regardless of what type of data exchange is to be recorded. In many typical implementations, the recording resources are lumped together in a pool, and resources are assigned from this pool to the predefined point on an as needed basis. This pool of resources may become exhausted, leaving none available if additional recording is demanded. Thus, the conventional approach to assigning recording resources does not efficiently or optimally assign recording resources.

There is thus a need for a technique for dedicating recording resources for recording data exchanges between a server and a user in an efficient and optimal manner, depending on the type of interaction to be recorded.

SUMMARY

The present invention is directed a method and system for selectively dedicating resources for recording data exchanged between entities attached to a network including at least one agent in an enterprise, a user, and a server connected to the agent and the user.

According to exemplary embodiments, at least one interconnection point is selected among interconnection points in the network including one or more points between the user and the server, between the server and a data distributor connected to the user and the agent, and between the agent and the server for dedicating recording resources to record the exchanged data. Recording resources are dedicated to the selected interconnection point for recording the exchanged data based on an objective for recording the data.

According to one embodiment, the interconnection points between the user and the server and between the agent and the server may each include one or more passive taps from which the exchanged data is recorded, and the interconnection point between the server and the data distributor may include one or more active taps from which the exchanged data is recorded. A passive tap or an active tap may be selected, depending on an objective for recording the exchanged data. For example, when the objective is to record high volumes or 100% of the captured data, a passive tap may be selected.

According to another embodiment, the interconnection point between the user and the server or between the agent and the server is chosen when the objective is to record substantially all of the exchanged data. When the objective is to record only a portion of the exchanged data, e.g., for quality monitoring, the interconnection point between the server and the data distributor is selected for dedicating the recording resources for recording the exchanged data.

According to another embodiment, the interconnection point between the user and the server is selected for dedicating the recording resources when the objective is to record a data exchange from the user's perspective. The interconnection point between the server and the agent is selected for dedicating the recording resources when the objective is to record a data exchange from the agent's perspective.

Further objects, advantages and features of the present invention will become more apparent when reference is made to the following description taken in conjunction with the accompanying drawings.

DETAILED DESCRIPTION

According to exemplary embodiments, a method and system are provided for selectively recording interactions between entities attached to a network using recording resources selectively dedicated to recording data from particular interconnection points in the network.

According to exemplary embodiments, captured data exchanged between a server and a user is selectively processed. In the following description, the server is referred to as a web server, and the user is referred to as a web browser. It will be appreciated, however, that the invention may be applicable to other types of servers and users.

Figure 1A:
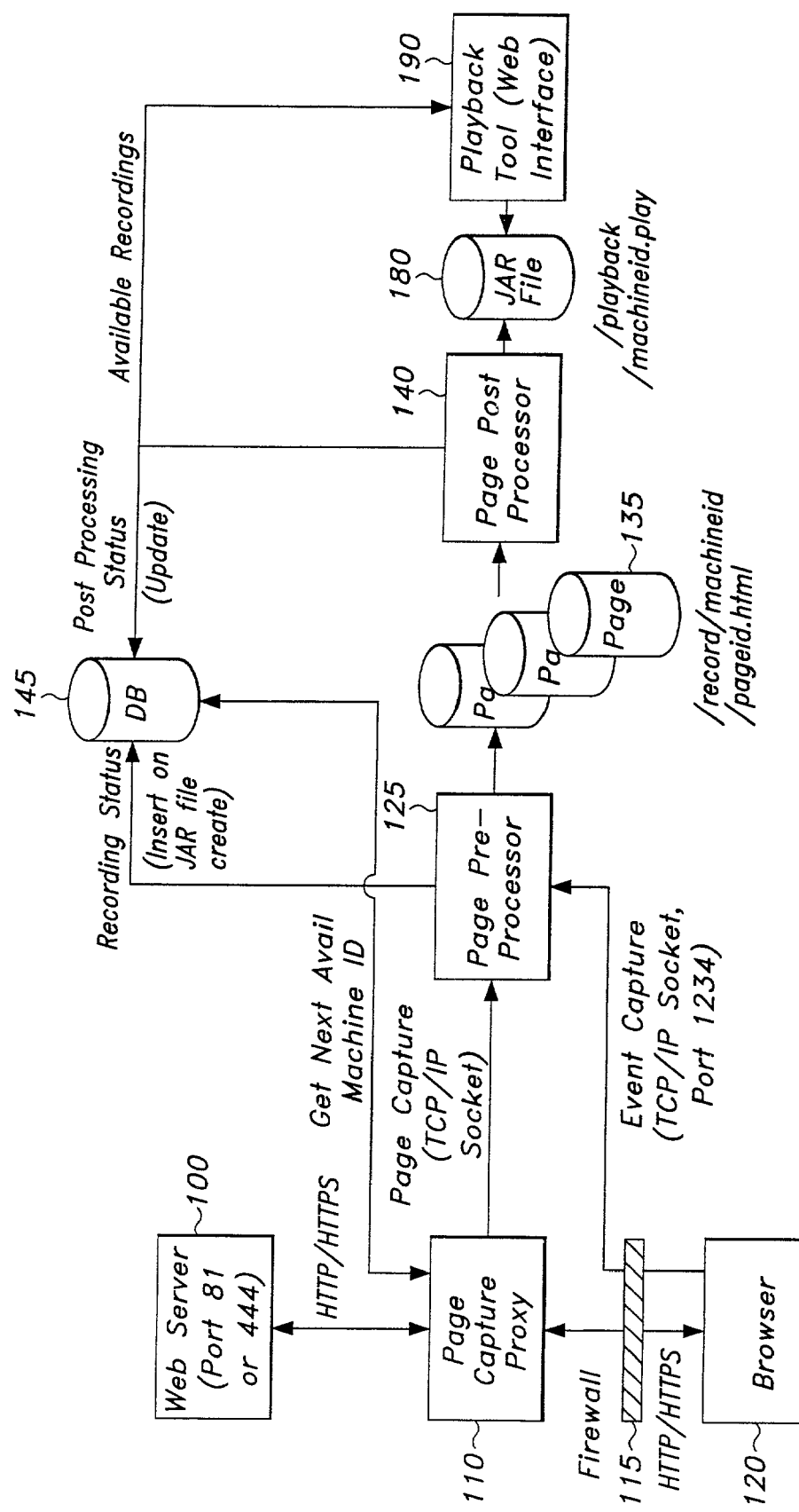
FIGS. 1A and 1B illustrate a system for selectively recording exchanged data according to an exemplary embodiment.

FIG. 1A illustrates an exemplary system for recording, capturing, and playing back interactions in which the invention may be implemented. The system includes a server, such as a web server 100, a data capturing module, such as a page capture module 110, and a user, such as a web browser 120. Although only one web server 100, page capture module 110, and web browser 120 are depicted in FIG. 1A, it will be appreciated that the invention is applicable to any number of servers, data capturing modules, and users.

The web browser 120 may be implemented in a personal computer, a telephone, etc. The web server 100 may be implemented as a server supporting any operating system, e.g., Unix, Linux, NT or Windows 2000.

The page capture module 110 is arranged between the web server 100 and the web browser 120. For security purposes, a firewall 115 may separate the web browser 120 and the page capture module 110.

The page capture module 110 operates independently from the web server 100 and the web browser 120. Thus, the page capture module 110 does not need to be customized for each type of web server but may be used with any web server, supporting any operating system.

Although the page capture module 110 operates independently from the web server 100 and the web browser, it may be implemented in the same device as the web server 100 or the web browser 120.

The page capture module 110 captures pages and other data exchanged between the web server 100 and the browser 120. Pages and other data may be captured continually or at designated intervals or time windows. The page capture module 110 may also record these pages and other data, or recording may be performed in a separate recorder server connected to the page capture module.

Each web browser 120 is assigned a unique machine identity (ID) by the web server 100. A persistent machine ID cookie may be created by the web server 110 and stored at the web browser 120 for this purpose. All pages served to a particular web browser 120 are identified and grouped by the machine ID.

Although the module 110 is described as a page capture module, according to exemplary embodiments, other types of data may also be captured. For example, events and attributes may be captured. Attributes may be captured in a manner similar to that in which pages are captured, as described above.

For event capturing, according to an exemplary embodiment an event capture module captures user side events and delivers these to the page capture module 110. The event capture module may be implemented as an applet 130 that is downloaded to the web browser 120. Although shown as a separate component, the event capture applet 130 is stored at the browser, with parameters such as the web browser machine ID, the host Internet Protocol (IP) address, and the current page name. The event capture applet 130 may be notified, for example, by JavaScript embedded in the current page, whenever an event needs to be recorded. The event capture applet 130 records events such as: page load, page unload, page scroll, page resize, and browser exit. The event capture applet 130 sends captured events to the page capturing module 110 via, for example, a Transmission Control Protocol/Internet Protocol (TCP/IP) socket connection on port 80 (or port 443 for secure exchanges).

Pages and other data captured during exchanges between the web server 100 and the web browser 120 at the page capture module 110 are sent from the page capturing module 110 to a page preprocessor 125 via, e.g., a TCP/IP socket.

According to an exemplary embodiment, each captured page is assigned a unique page ID and is associated with a specific browser user machine ID. Each page may also contain the date and time that the page was captured and the page status (recording, processing, playback, etc.) After pages are captured, this information is extracted from the captured page, and a new record is inserted into a database 145.

The page preprocessor 125 acts as a recorder server and stores the captured data in a device such as a database 145. The pages 135 are then passed on to the page post-processor 140. Alternatively, the page capturing module 110 may perform this recording. To reduce the amount of storage necessary, only predetermined portions of data may be stored, e.g., the request portion or the response portion. Also, only data satisfying predetermined rules, e.g., rules indicating timing, may be stored. When the captured pages are recorded, identifying information may also be recorded, e.g., a session record ID, a date/time of recording, a machine ID, etc.

An exemplary page capturing module and an exemplary page preprocessor are described in more detail in the aforementioned U.S. patent application Ser. No. 10/061,469.

A post-processing module 140 determines which captured data satisfies predefined rules, e.g., business rules, and records this data in a file 180, such as a Java Archive (JAR) file. The database 145 is updated to indicate what captured data has been selected and recorded for playback. This is described in more detail below with reference to FIG. 1B.

A playback tool 190 selects recorded data from the database 180, using the information in the database 145. An exemplary playback tool is described in more detail in the afore-mentioned U.S. patent application Ser. No. 10/061,491.

Although not shown in the interest of simplifying the illustrations, it will be appreciated that the system in FIG. 1A may also include other components, e.g., configuration files used for processing.

Figure 1B:
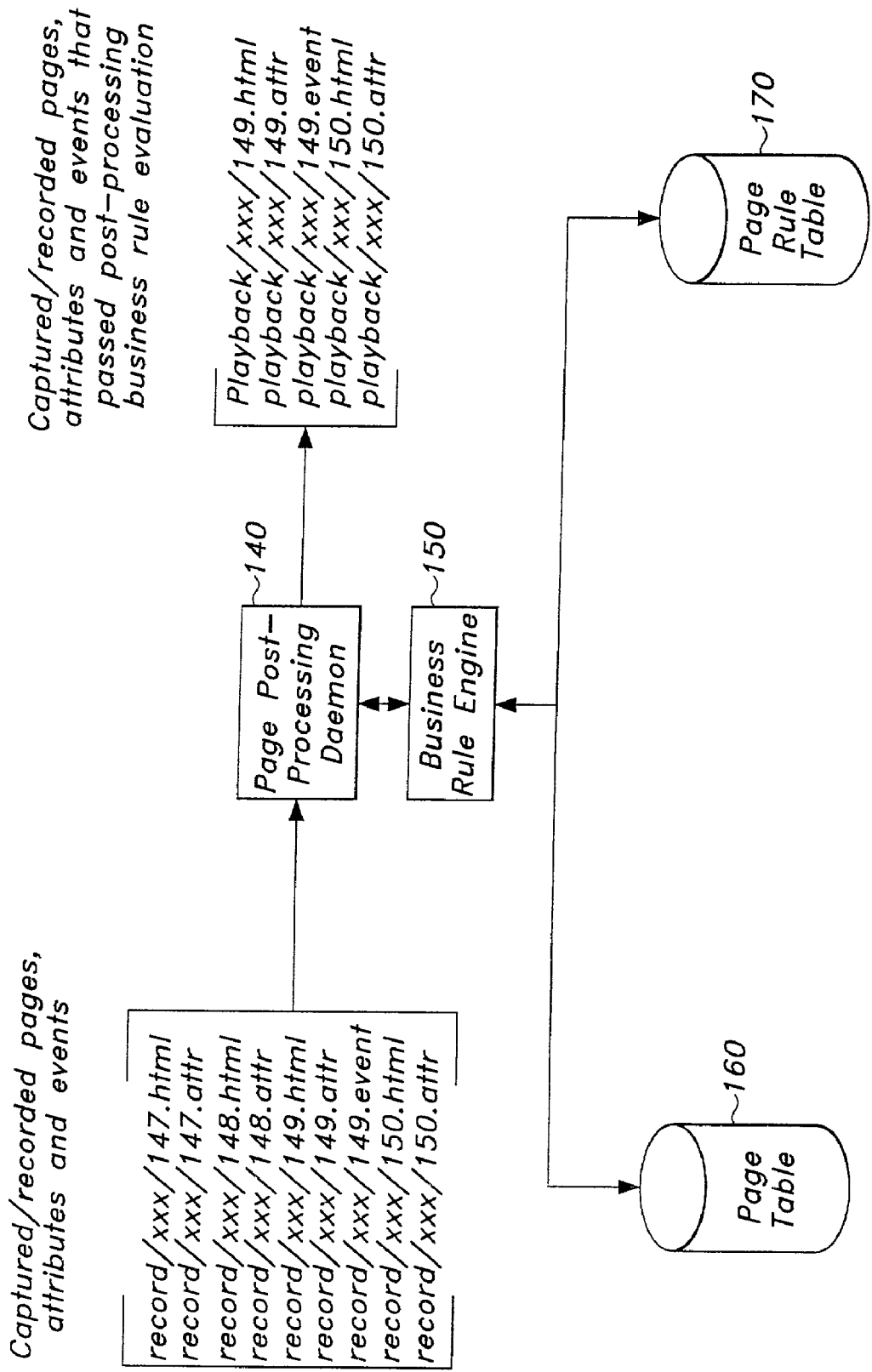

FIG. 1B illustrates in detail an exemplary system for processing captured data according to an exemplary embodiment. Captured and recorded pages, attributes, and events are fed to a page post-processing program running on a page post-processor 140. A business rules engine 150 delivers business rules to the post-processor 140 that evaluate the captured/recorded pages to determine whether they satisfy the business rules.

The terminology "business rules" has a commonly accepted meaning in the art and in this context refers to business elements for comparison with captured data in real time. Examples of comparison of captured data with business rules include determining whether an interaction resulted in a sale greater than a predetermined number of dollars, determining whether an interaction lasted longer than a predetermined number of minutes, etc. Also, a business rule comparison may be in the form of voice recognition. Business rule comparison may be made active or inactive on a defined schedule.

Data from a page table database 160 and a page rule table database 170 may be used during the evaluation by the business rule engine 150. Pages that satisfy the business rules are recorded for future playback. The page table and page rule database are updated after post-processing.

Further details regarding post-processing are provided in the afore-mentioned U.S. patent application Ser. No. 10/061,489.

Figure 2:
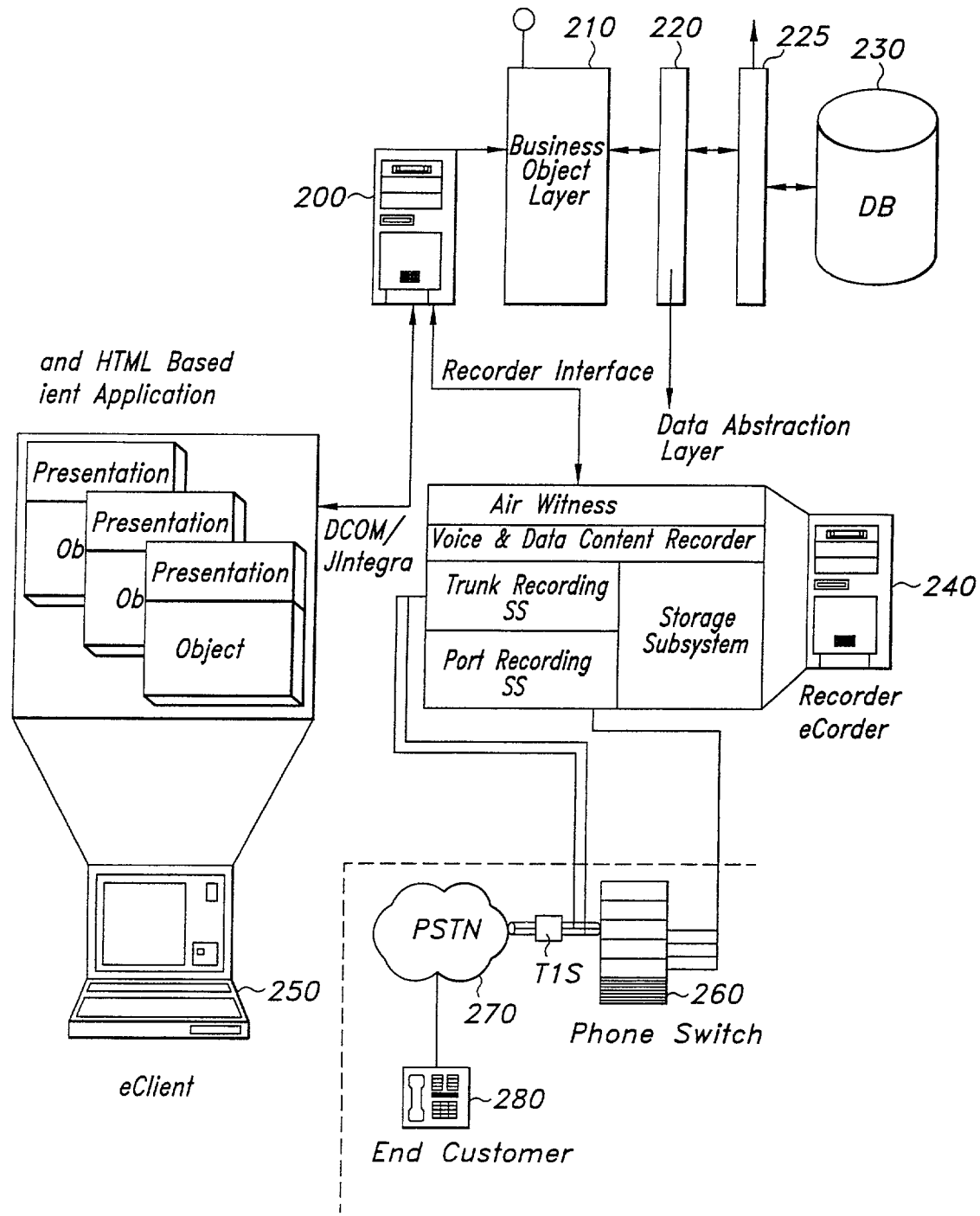
FIG. 2 illustrates an exemplary system for selectively recording exchanged data in which the invention may be implemented.

According to an exemplary embodiment, business rules are applied to captured pages using an applications server such as the server 200 shown in FIG. 2. The server 200 show in FIG. 2 may be implemented as a Component Object Model (COM) based server.

According to an exemplary embodiment, the server 200 includes a business rules engine, such as the engine 150 shown in FIG. 1B, an editor, and a scheduled rules processor. The server 200 may also be connected to a business object layer (BOL) 210, a data abstraction layer (DAL) 220 and 225 and a repository or database 230. The components 210, 220, 225 and 230 may be included in the server or as one or more separate entities.

Attributes of contacts and metadata may be stored in the database 230, as well as business rule data populated and manipulated by the editor. The server 200 communicates with the database 230 to obtain the business rules. The engine 150 applies the business rules to the captured data and communicates with a recorder server 240 for recording the captured data that satisfies predetermined business rules.

The business rules editor may be a Java applet running in a browser (e.g., MSIE or NN) on the client machine such as the computer 250 shown in FIG. 2. The applet may communicate to COM objects on the server 200 using a COM-Java bridging tool. This provides the capability for the applet to access the COM objects as though they were Java objects. The editor applet may be integrated with a category manager and user security administrator applets into what appears to the user to be one application The BOL 210 interfaces with both the business rule editor applet and the DAL 220 and 225 to manage traffic to and from the database 230.

The server 200 communicates with a client computer, such as the computer 250, which may be used by an agent. The client computer may be implemented as a browser-based application, utilizing Java applets and HTML, and interfacing with some COM-Java bridging tool (Jintegra or R-JAX) to allow the Java-based client to communicate with the COM-based server.

The recorder server 240 communicates with an end user via, e.g., a phone switch 260 and a PSTN 270. The phone switch also referred to as a "data distributor" may include, e.g., a private branch exchange (PBX) and an automatic call distributor device (ACD).

According to an exemplary embodiment, only captured data that satisfies predetermined business rules is recorded. According to this embodiment, the server 200 selects data from data exchanged over the network connecting the server 200, the client 250, and the user 280 that satisfies predetermined business rules. Captured attributes and content are analyzed in, for example, the BRE 150 at the server 200, to determine whether they satisfy predetermined business rules. Data that satisfies these rules may be recorded in a database 230. A user may be notified of customer contact center transactions.

According to another embodiment, all captured data may be recorded, and the data that does not satisfy predetermined business rules may be discarded. This ensures that the entire interaction is captured. If the storage capacity is large enough, this can, in effect, capture interactions in the past.

According to yet another embodiment, only portions of captured data may be recorded. This partial recording may be most beneficial for purposes such as transaction verification in which partial samples are sufficient.

According to another embodiment, data may be captured by capturing only changed areas of an agent's screen to minimize network utilization. This is described in more detail in commonly assigned U.S. Pat. No. 5,790,798, incorporated herein by reference.

According to another embodiment, random agent monitoring and event monitoring are provided in which a percent of contacts is automatically monitored and recorded for future playback. Live monitoring may also provided, in which monitoring for both voice and data or real-time contacts may be initiated, and these contacts may then be recorded. This sampling may be most beneficial for purposes such as quality monitoring, in which samples of interactions are sufficient.

According to another embodiment, one or more agents 250 may also initiate recording of real-time contacts, e.g., when there is a serious complaint or customer feedback about a new product or service that is being provided to a customer. Agents may also disable monitoring for a particular call for various purposes, e.g., if a customer requests it for legal purposes.

According to an exemplary embodiment, exchanged data may be recorded from one or more points between the user 280 and the phone switch 260, between the phone switch and the server 200, or between the client (agent) 250 and the server 200. Points between the user 280 and the phone switch 260 may be referred to as "trunk-side points", points between the server 200 and the phone switch 260 may be referred to as "service observation points", and points between the agent 250 and the server 200 may be referred to as "station-side points". The determination of which point to record from may be performed by the server 200.

According to exemplary embodiments, the server 200 selectively dedicates recording resources for recording data from one ore more points within the network. For this purpose, the server includes a media channel broker that assigns available recording resources from a media list for recording from one or more interconnection points that are selected based, e.g., on the objective(s) for recording the data. The channel media broker may be contained in a content manager 155 shown as part of a system shown in FIG. 3A and FIG. 3B.

Figure 3A:
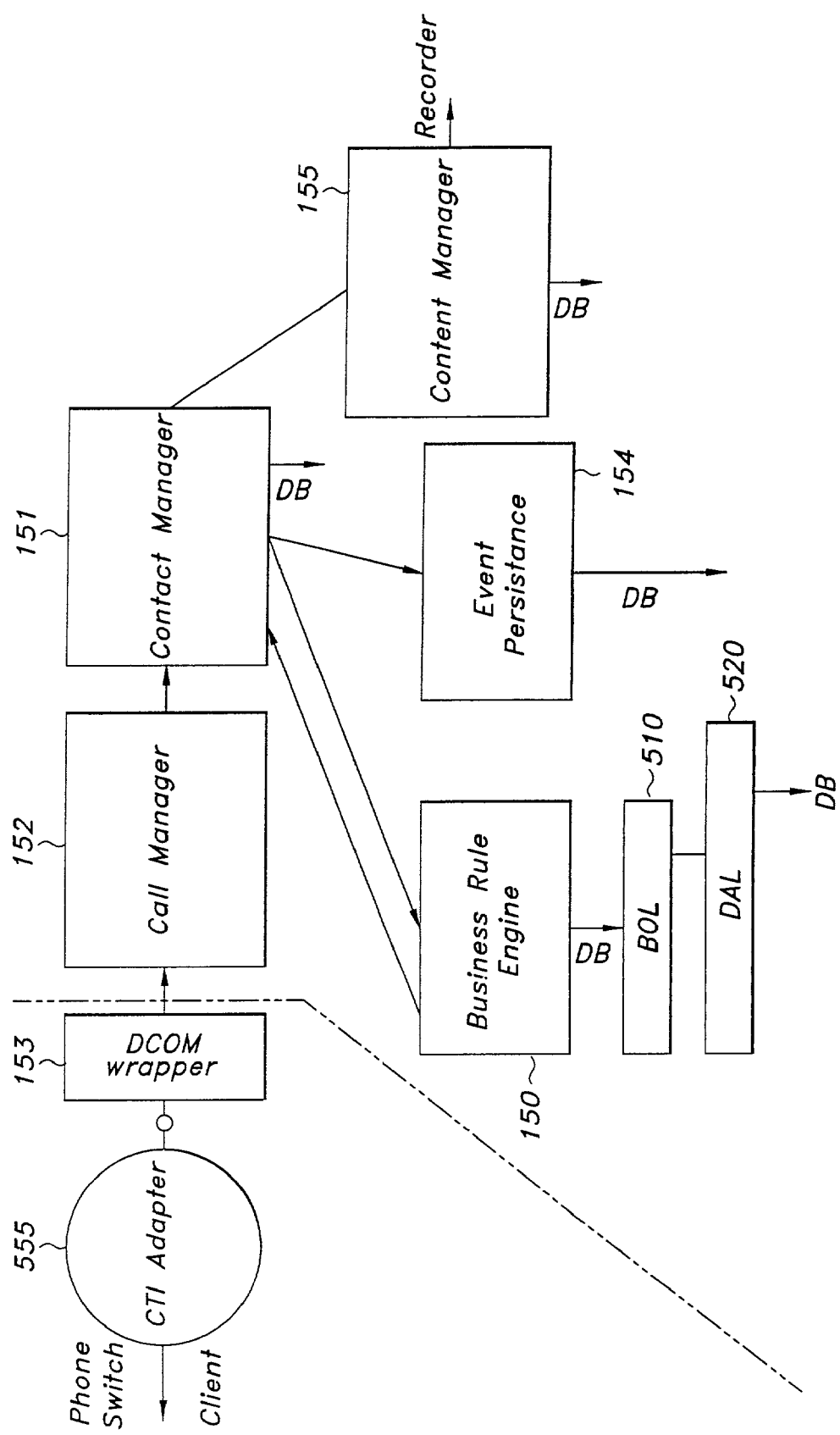
FIGS. 3A and 3B illustrate details of an application server for dedicating recording resources according to an exemplary embodiment.
Figure 3B:
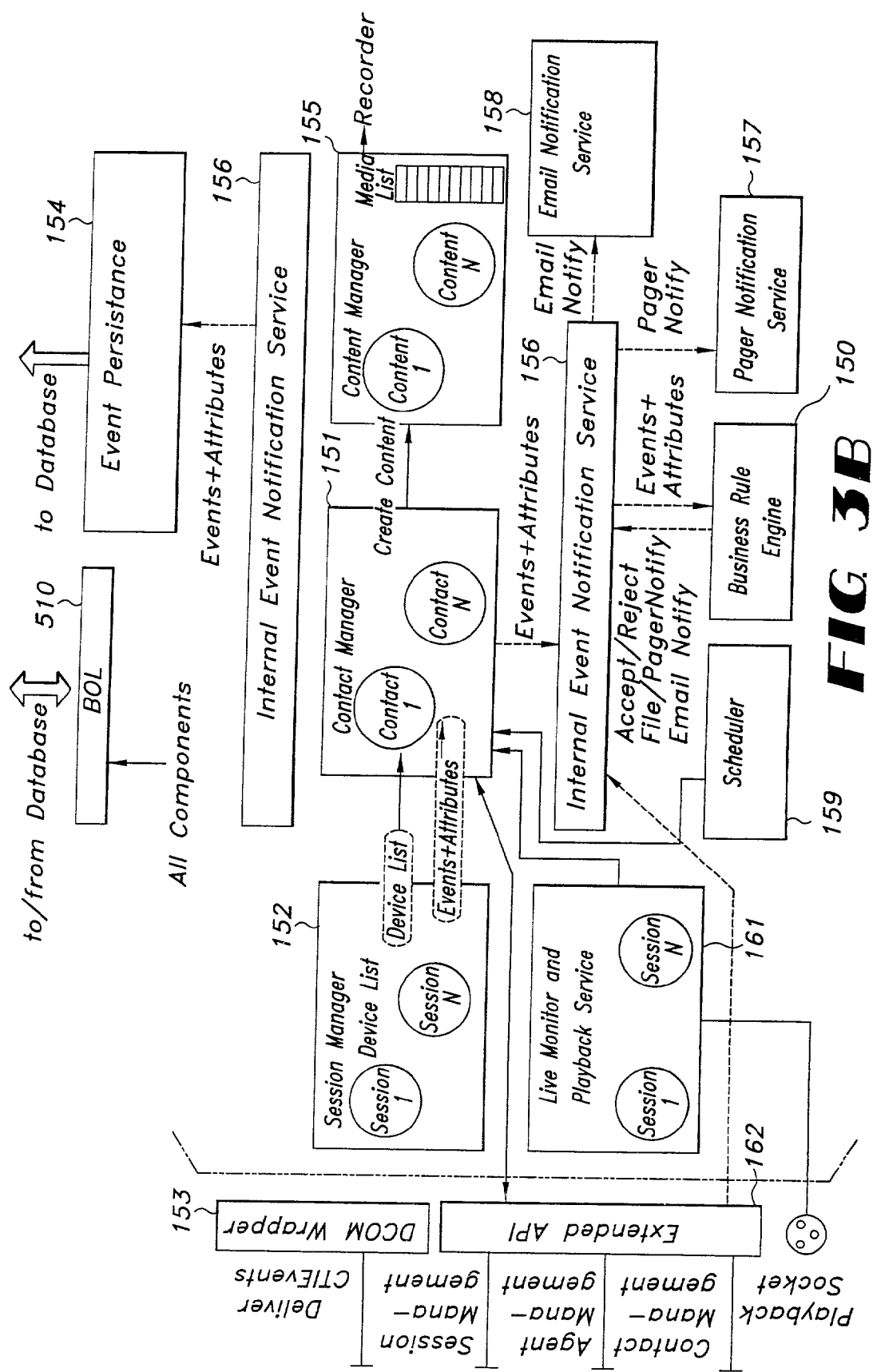

Referring to FIGS. 3A and 3B, the content manager 155, which manages how content is recorded, communicates with a contact manager 151. The contact manager 151 manages contact folders in which contacts/exchanged data is recorded. The contact manager 151 is in communication with the business rules engine 150 for mapping business rules to folders. The business rules engine 150, in turn, is in communication with a BOL 510 that communicates with the database, e.g., through the DAL 520.

As shown in FIG. 3B, the contact manager 151 may communicate with the business rule engine 150 via an internal event notification service 156. The internal event notification service 156 controls notification of event occurrence through the email notification service 158 and the pager notification server 157. Notification is described in more detail in the afore-mentioned U.S. patent applications entitled ""Methods and System for Categorizing and Cataloguing Recorded Interactions" and "Method and System for Providing Access to Captured Multimedia Data from a Multimedia Player".

As shown in both FIGS. 3A and 3B, the contact manager is 151 also in communication with the client via a call or session manager 152 that manages sessions, a DCOM interface 153, and a CTI adapter 555. The contact manager 151 also communicates with the event persistence 154, e.g., through the internal event notification service 156. The event persistence 154 maintains events and permits a user to jump to a point in a contact at which an event occurred. The event persistence 154, in turn, communicates with the database 530.

Also shown in FIG. 3B are a scheduler 159 and a live monitoring and playback service 161. The scheduler 159 coordinates scheduling of event occurrence. The live monitoring and playback service 161 controls playback of recorded data and live monitoring of data and is connected via a playback socket to a user desiring to playback or monitor the data.

The components to the right of the dashed-dotted lines in FIGS. 3A and 3B may be implemented, e.g., in an application server 200. Alternatively, some of the components shown to the right of the dashed-dotted lines in FIGS. 3A and 3B may be implemented as separate entities.

According to an exemplary embodiment, the content manager 155 takes into account one ore more objectives for recording the data for selecting which point(s) in the network to record from.

Another objective for recording the data may be for recording only a portion of the exchanged data. This may be useful for quality assurance monitoring, when only a few samples of data are needed. According to exemplary embodiment, the service observation point is best suited for recording data for this objective. The service observation point typically leverages a pool of resources (service observation ports) on a user's phone switch. This is best suited for customers who are interested primarily in quality assurance sampling or otherwise very low volume recording.

Service observation ports are typically provisioned for a relatively small percentage of the overall number of agents that might be monitored. Thus, it is possible to run out of these ports at certain times. Thus, the service observation point may not be suitable when larger percentages of data needs to recording.

Another objective for recording the data may be for recording 100% or a high volume of interactions. This may be useful for sales verification where an agent needs to record the customer's consent to purchase a product, and a recording resource needs to always be available. The agent (station) side interconnection point can handle a designated recording resource for each agent telephone that is capable of being recorded. The trunk-side interconnection point can handle dedicated recording resources for each trunk (or telephone line) that is capable of being recorded. Also, passive taps, such as those that may be included at the trunk side and at the station side do not require monitoring while active taps, such as those that may be included at the service observation port, do require monitoring, e.g., at the switch (PBX). Thus, for recording a large number of interactions, the station-side interconnection point and the trunk side interconnection would likely be most suitable.

Another objective for recording the data may be to record the data from a particular entity's perspective, e.g., the user's perspective. This may be useful, for example, if a call from a user is not completed and never deliver to the agent. With agent-side recording, the call must first have been connected to an agent in order to record. Thus, agent-side recording may not be a suitable implementation for this condition. With trunk-side recording, the call may be captured as the customer navigates his or her way through eh interactive voice response system (IVR) system that asks for the customer's account number, PIN, etc. This allows the entire call center transaction to be captured form the customer's perspective.

It will be appreciated that the recording objective may also be to record data from the agent's perspective or from the station's perspective. For these cases, agent-side recording and service observation point recording would be selected, respectively.

According to an exemplary embodiment, objectives for recording data may correspond to one or more business rules that are applied to determine what data is recorded.

For example, if an objective for recording data is to record a 3% random sample of all agent calls for quality assurance purposes, a business rule may be created that indicates that data satisfying a 3% random sample of all agent calls is to be recorded. Given the small number of calls represented by this business rules, the service observation point is the most suitable interconnection point from which to record the exchanged data. Thus, if this is the business rule to be applied, a service observation point would be selected as the interconnection point from which to record the exchanged data.

As another example, if an objective for recording data is to record 100% of those calls that have results in the sale of a particular product, a business rule may be created that indicates that 100% of data resulting in the sale of that particular product should be recorded. Since the station-side points and the trunk-side points are the most suitable for 100% recording, either or both of these points may be selected as the interconnection point(s) from which to record the exchanged data.

As yet another example, if an objective for recording data is to record 100% of those calls where the customer transaction ended "in" the interactive voice response (IVR) and was not routed to agent for handling, a business rule may be created that indicates that 100% of data ending in the IVR should be recorded. Given that the trunk-side point is the only suitable point for 100% recording and recording where the agent is not contacted, the trunk-side point would be selected as the interconnection point from which to record the exchanged data.

Figure 4:
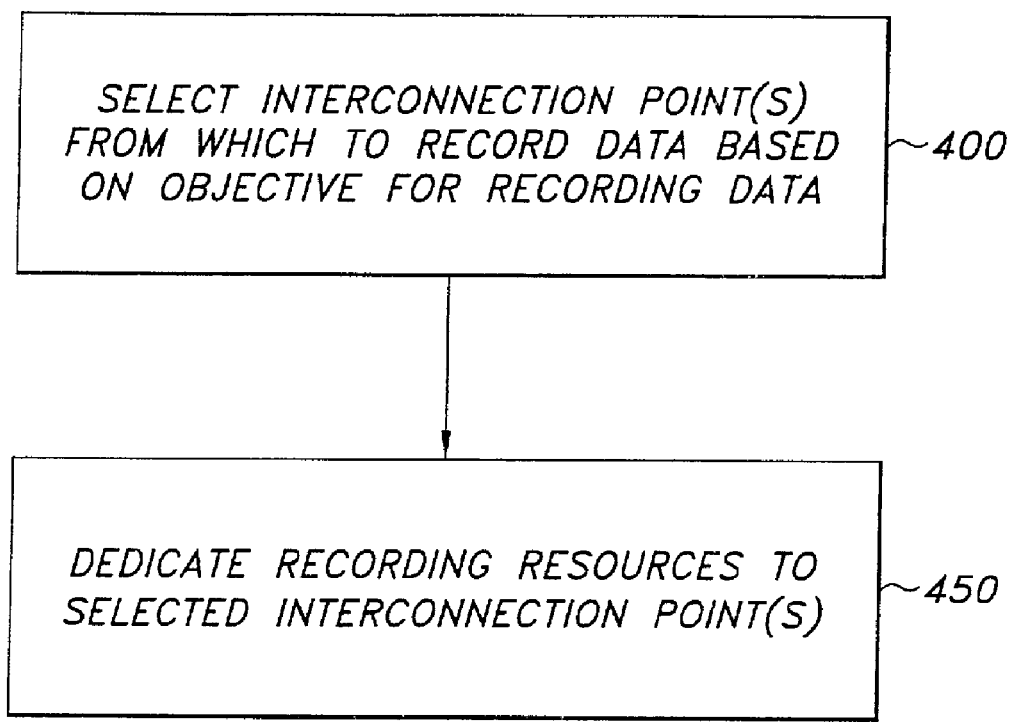
FIG. 4 illustrates an exemplary method for dedicating recording resources according to an exemplary embodiment.

FIG. 4 illustrates an exemplary method for designating recording resources for recording from one or more interconnection points. The method begins at step 400 at which one or more interconnection points are selected in the network from this to record data based, e.g., on one or more objectives for recording the data. Next, at step 450, the recording resources are dedicated to the selected interconnection points(s). From this point, recording may commence.

In addition to data recording, after-call monitoring may also be provided, by which an agent's screen actions after the contact ends may be monitored or recorded. For example, an agent may wait until after the customer hangs up to enter information that could have been entered during a call. This type of situation offers an excellent training opportunity. Agents may be monitored from any point, based, e.g., on login information from the switch.

Also, customer transactions may be documented and retained by capturing the customer's verbal authorization. This voice signature capability simplifies the sale process and reduces costs by leveraging verbal rather than written authorization for certain types of transactions, such as consumer debits authorized over the telephone.

In addition, agent feedback may be provided either during a contact or after a contact, informing the agent that the contact is being recorded or has been recorded. Training may be provided to the agent as appropriate, based on the recorded interaction.

It should be understood that the foregoing description and accompanying drawings are by example only. A variety of modifications are envisioned that do not depart from the scope and spirit of the invention. The above description is intended by way of example only and is not intended to limit the present invention in any way.

The invention claimed is:

1. A method for selectively dedicating resources for recording data exchanged between entities attached to a network including at least one agent in an enterprise, a user, and a server connected to the agent and the user, the method comprising the steps of:
   selecting at least one interconnection point among interconnection points in the network including one or more points between the user and the server, between the server and a data distributor connected to the user and the agent, and between the agent and the server for recording the exchanged data based on an at least one objective for recording data;
   dedicating recording resources to the selected interconnection point for recording the exchanged data;
   wherein the interconnection points between the user and the server and between the agent and the server each include one or more passive taps from which the exchanged data can be recorded, and the interconnection point between the server and the data distributor includes one or more active taps from which the exchanged data can be recorded;
   wherein the selecting of at least one of the interconnection points includes the selection of one or more active or passive taps;
   wherein an active tap is configured to determine whether an exchange should be recorded.

2. The method of claim 1, wherein the step of selecting includes selecting a passive tap to dedicate the recording resources to when the objective is to record a high volume or substantially all of the exchanged data.

3. The method of claim 1, wherein the step of selecting includes selecting an active tap to dedicate the recording resources to when the objective is to record a small sampling of the exchanged data.

4. The method of claim 1, wherein the step of selecting includes selecting the interconnection point between the user and the server or between the agent and the server when the objective is to record substantially all of the exchanged data.

5. The method of claim 1, wherein the step of selecting includes selecting the interconnection point between the server and the data distributor for dedicating recording resources to when the objective is to record only a portion of the exchanged data.

6. The method of claim 5, wherein the step of selecting includes selecting the interconnection point between the server and the data distributor when the objective is to record the exchanged data for quality monitoring.

7. The method of claim 1, wherein the step of selecting includes selecting the interconnection point between the user and the server for dedicating the recording resources to when the objective is to record a data exchange from the user's perspective.

8. The method of claim 1, wherein the step of selecting further comprises selecting the interconnection point between the server and the agent for dedicating the recording resources to when the objective is to record a data exchange from the agent's perspective.

9. The method of claim 1, wherein the objective for recording corresponds to a business rule being applied for recording the exchanged data.

10. The method of claim 1, further comprising providing feedback to the agent when the exchanged data is being recorded.

11. The method of claim 1, further comprising recording the exchanged data using the dedicated recording resources.

12. The method of claim 1, further comprising monitoring the exchanged data.

13. The method of claim 12, wherein the step of monitoring the exchanged data is performed simultaneously with recording of the exchanged data.

14. The method of claim 1, wherein the data exchanged comprises one or more voice messages, web chat messages, instant messages, e-mail messages, or Internet transactions.

15. The method of claim 1, wherein the steps are performed during simultaneous exchanges between a plurality of agents and a user, the agent and a plurality of users, or a plurality of agents and a plurality of users.

16. A system for selectively dedicating resources for recording data exchanged between entities attached to a network including at least one agent in an enterprise, a user, and a server connected to the agent and the user, the system comprising:
   means for selecting at least one interconnection point among interconnection points in the network including points between the user and the server, between the server and a data distributor connected to the user and the agent, and between the server and the agent; and
   means for dedicating recording resources to the selected interconnection point for recording exchanged data from the selected interconnection point based on at least one objective for recording the exchanged data;
   wherein the interconnection points between the user and the server and between the agent and the server each include one or more passive taps from which the exchanged data can be recorded, and the interconnection point between the server and the data distributor includes one or more active taps from which the exchanged data can be recorded;
   wherein the selecting of at least one of the interconnection points includes the selection of one or more active or passive taps;
   wherein an active tap is configured to determine whether an exchange should be recorded.

17. The system of claim 16, wherein the selecting means selects a passive tap for dedicating recording resources to when the objective is to record a high volume or substantially all of the exchanged data.

18. The system of claim 16, wherein the selecting means selects an active tap to dedicate the recording resources to when the objective is to record a small sampling of the exchanged data.

19. The system of claim 16, wherein the selecting means selects the interconnection point between the user and the server or between the agent and the server for dedicating recording resources to when the objective is to record substantially all of the exchanged data.

20. The system of claim 16, wherein the selecting means selects the interconnection point between the server and the data distributor when the objective is to record only a portion of the exchanged data.

21. The system of claim 20, wherein the selecting means selects the interconnection point between the server and the data distributor when the objective is to record the exchanged data for quality monitoring.

22. The system of claim 16, wherein the selecting means selects the interconnection point between the user and the server when the objective is to record the exchanged data from the user's perspective.

23. The system of claim 16, wherein the selecting means selects the interconnection point between the server and the agent for dedicating recording resources to when the objective is to record the exchanged data from the agent's perspective.

24. The system of claim 16, wherein the objective for recording corresponds to a business rule being applied for recording the exchanged data.

25. The system of claim 16, further comprising means for providing feedback to the agent when the exchanged data is being recorded.

26. The system of claim 16, wherein the dedicated resources record the exchanged data.

27. The system of claim 16, further comprising means for monitoring the exchanged data.

28. The system of claim 27, wherein the means for monitoring the exchanged data performs monitoring simultaneously with recording of the exchanged data.

29. The system of claim 16, wherein the data exchanged comprises one or more voice messages, web chat messages, instant messages, e-mail messages, or Internet transactions.

30. The system of claim 16, wherein interconnection points are selected, the resources are dedicated, and the exchanged data is recorded during simultaneous exchanges between a plurality of agents and a user, the agent and a plurality of users, or a plurality of agents and a plurality of users.

* * * * *